INVENTOR.
FRANCIS HARDING

Oct. 18, 1966  F. HARDING  3,279,330
METHOD FOR MAKING ALL PLASTIC VALVED BAGS
Filed June 19, 1964  3 Sheets-Sheet 2

INVENTOR.
FRANCIS HARDING

Oct. 18, 1966  F. HARDING  3,279,330
METHOD FOR MAKING ALL PLASTIC VALVED BAGS
Filed June 19, 1964  3 Sheets-Sheet 3

CUTTING STATION

INVENTOR.
FRANCIS HARDING

United States Patent Office 3,279,330
Patented Oct. 18, 1966

3,279,330
METHOD FOR MAKING ALL PLASTIC
VALVED BAGS
Francis Harding, Pensacola, Fla., assignor to St. Regis Paper Company, New York, N.Y., a corporation of New York
Filed June 19, 1964, Ser. No. 376,511
3 Claims. (Cl. 93—35)

The present invention pertains to methods for making all-plastic bags and more particularly bags the walls of which are formed of a single sheet or ply of a flexible thermoplastic resinous sheet material, and which bags are provided with a valve opening and a valve sleeve that protrudes or extends from the valve opening into the interior of the bag through which the bag can be filled, this application being a continuation in part of applicant's application Serial No. 293,005, filed July 5, 1963, on which Patent No. 3,221,789 was granted on December 7, 1965, with claims directed to such plastic bags as products. Certain methods and apparatus for manufacturing bags with some of the features of the present application, are also disclosed and claimed in applicant's co-pending application Serial No. 285,317, filed June 4, 1963.

Bags formed of flexible thermoplastic resinous sheet materials are available and possess certain desirable and obvious advantages over paper bags. Paper bags provided with valves that seal the bag when the bag has been filled are also known. However, the all-plastic bags provided with a valve opening and valve sleeve that have heretofore been available have not been entirely satisfactory, especially with respect to the means or manner in which the valve sleeve was placed and held by or joined to the walls or seam of the bag. The weakest portion of most of the prior all-plastic valved bags is the area at the juncture of the valve sleeve and the valve opening, at which area the bag was most susceptible to tearing.

A principal object of the present invention is to provide an improved method for making all-plastic bags having a valve opening and sleeve that is much less susceptible to tearing at the juncture of the valve opening and the valve sleeve than all-plastic valved bags that were heretofore available. A further object of the present invention is to provide a method for producing such improved all-plastic valved bags that involves a minimum of steps or operations and that is adaptable to the production of such bags by mechanical means in a continuous manner in a machine. Other objects and advantages of the invention, some of which are referred to hereinafter, will be obvious to those skilled in the art to which it pertains.

The walls of the bag of the present invention, including any gussets that are included in the side walls of the bag, are formed from a single integral essentially rectangular sheet of a thermoplastic resinous material such as a sheet of polyethylene resin. The valve sleeve is made from a sheet of the same or a similar thermoplastic resin which is compatible—that is, fusible—with the thermoplastic resin from which is made the sheet from which the walls of the bag are formed. The sheet that is used to form the valve sleeve is preferably thinner than the sheet from which the walls of the bag are formed. The sheet from which the walls of the bag are formed will have a thickness of about 5, 6, or 8 mils (which are equivalent respectively to 0.005, 0.006 and 0.008 inch, and 0.01270, 0.01524, and 0.02032 centimeter). Generally the thickness of the sheet from which the sleeve is formed will be between about 2 and 3 mils (which are equivalent to 0.002 and 0.003 inch, and 0.00508 and 0.00712 centimeter, respectively), which is about one-half or one-third the thickness of the sheet from which the walls are made.

The valve sleeve that is an element of the bag of the present invention is formed by folding over once upon itself an essentially rectangular piece of the thermoplastic resinous sheet material described hereinbefore, which is then joined to the walls of the bag at an opening in the side seam of the bag as described more fully hereinafter.

In making the bag of the present invention, a molten thermoplastic resin which is compatible—that is, fusible —with the thermoplastic resin from which is made the sheet from which the walls of the bag are formed is extruded as a strand or bead onto a flap or strip close to the edge of the sheet and in a direction parallel to the edge of the sheet. This strand of thermoplastic resin may be a continuous strand extending along the entire length of the edge from the top to the bottom of the sheet, or preferably extending only far enough to unite or join one side of the valve sleeve at a strip or flap along its edge to the edge strip or flap of the sheet at the point at which the opening or aperture of the valve is to be located. The valve sleeve is then placed upon this extruded strand of molten resin in the position described and is pressed to the sheet while the strand is still hot or warm and plastic so as to join or fuse the surface of the valve sleeve firmly to the flap or the wall of the bag by means of this strand.

The sheet to which one surface of the valve sleeve has not been joined or fused by means of the extruded strand of thermoplastic resin is then folded into a bag tube and pressed flat. If the desired bag is to have side gussets or expandible bellows folds, which is a preferred embodiment of the present invention, the sheet should be folded as required to produce the desired gussets before the seam in the bag tube is fused or joined.

In the folding or tube-forming step or operation, the vertical or lateral edge strips or flaps of the sheet are brought into overlapping relation with respect to each other so that they are ready to be joined or fused into a seam which also will include the theretofore unattached outer side of the valve sleeve.

In the tube-forming step, the flap on the front wall to which the valve sleeve has been fused is raised and superimposed with the side to which the valve sleeve is fused facing downwardly over the flap that is part of the other or rear wall of the bag. The flaps on the front and rear walls of the bag are also referred to herein as the long and the short flaps, respectively, merely for convenience.

The bag tube is then pressed flat. The overlapping flaps are then spread apart or separated from each other and, while the nozzle of an extrusion die is inserted therebetween, a second strand of molten thermoplastic resin is extruded parallel to the edge of the sheet upon the underlying short flap of the rear wall, this second strand extending along the entire length of the edge from the bottom to the top of the bag, or if a continuous roll or web of thermoplastic resinous sheet material is being formed into a continuous bag tube, this second strand should be extruded as a continuous strand.

Without delay and while the extruded second strand is still warm and plastic, the two overlapping flaps are pressed together to seal or join them into a seam. In these tube-forming and sealing steps the other theretofore unattached surface of the valve sleeve is brought into contact with the second extruded strand of thermoplastic resin and is firmly fused and joined by that strand to the short flap of the rear wall of the bag. This second strand also seals or fuses the remaining exposed portions of the overlapping flaps at the edges of the sheet to form the seam.

This second continuous strand of thermoplastic resin will preferably be extruded at a greater distance from the edge of the sheet than was the first strand so that, after the seam has been joined, the first strand will be outside rather than in the interior of the bag.

If the bags of the present invention are produced in a machine in a continuous manner from a continuous roll or web of thermoplastic resinous sheet material, the continuous bag tube will thereafter be cut across its entire width into desired bag lengths. The thus cut conterminous open ends of the bag tubes of the desired length will thereafter be closed in conventional manner with conventional or other end closings or closures as described hereinafter.

The sequence of steps or operations that are involved in joining the valve sleeve to the bag walls to form a valve opening in a side seam of the bag and the method of joining the seam of the bag to form the resulting bag tube in accordance with the process of the present invention are unique features of the present invention.

A bag tube can easily be formed from an essentially rectangular sheet of thermoplastic resinous sheet material by folding the sheet so that the two flaps at the vertical or lateral sides of the sheet overlap, joining the overlapping flaps by extruding a strand of molten thermoplastic resin onto one of the flaps at one of the sides of the sheet, and thereafter, while the strand is still hot and plastic, pressing the two flaps firmly together to join them into a seam. When a valve sleeve is to be joined into a seam and leave an opening or aperture through which the bag can be filled, at least two or more strands of thermoplastic resin are required, since both sides of the valve sleeve must be joined to the valve opening between the walls or seam of the bag. The joining of the valve sleeve to the bag involves the extrusion of two or more strands of the thermoplastic resin, at least one strand upon each of the flaps at the two vertical or lateral side edges of the sheet that are to be joined to form the seam and, before the flaps are folded over and pressed together, inserting the valve sleeve between the extruded strands. However, because extruded strands of molten thermoplastic resins normally cool and solidify quickly during intervals that are much shorter than are required to complete the steps of inserting the valve sleeve and completing the folding and tube-forming operations, it has not been possible to produce satisfactory bags from thermoplastic resinous sheet materials using strands of molten thermoplastic resins for joining the valve sleeves and seams of bags of the type to which the process of the present invention is particularly directed.

Although it is possible to join surfaces of thermoplastic resinous sheets together by means of heat, which can be applied in various manners, processes that involve the use of extruded strands of thermoplastic resins are dependent upon the maintenance of the extruded strand in a fluid or plastic condition until the surfaces to be joined or fused by means of the strand are brought and pressed into contact with the strand. Since most molten thermoplastic resins after they have been extruded remain plastic and fluid for only a short interval before they harden and become no longer adhesive, the use of extruded strands of molten thermoplastic resins to join surfaces of thermoplastic resinous sheet materials in the production of all-plastic bags has not heretofore been considered feasible.

The first strand of extruded molten thermoplastic resin that is used to join one surface of the valve sleeve to the flap at the vertical or lateral edge of the sheet in accordance with the process of the present invention need not be any longer or extend any further along the flap at the edge of the sheet than is necessary to join the strip or flap at the edge of the valve sleeve firmly to the sheet. After the valve sleeve is joined to the sheet and the strand of resin has cooled and solidified, the sheet is folded into a bag tube and the second strand of thermoplastic resin is extruded onto the flap or strip at the edge at the opposite side of the sheet. This second strand, whose purpose is to join the other surface of the valve sleeve to the other wall of the bag and to join the two flaps at the sides of the bag into a seam, must be as long as the seam or flaps at the edges of the sheet that are to be joined. If the first strand of thermoplastic resin extends along the entire length of the flap at the edge of the sheet, the second strand should preferably be extruded so as to leave the first strand on the outside instead of on the inside of the bag tube, as stated hereinbefore, since such first strand, to which only one side of the valve sleeve is joined, may serve to reinforce the protruding edge or flap at the seam and make it less susceptible to tearing.

Although the term seam is used throughout this specification to refer to overlapping flaps or strips of the sheet, it is to be understood that the term also includes convolute seams, that is, seams made by winding, curling, or cuffing the flap at an edge on one side of the sheet over and upon itself and joining the back surface of the sheet at the curled or cuffed flap with the flap on the edge of the front surface of the opposite side of the sheet, as well as seams made by winding, curling, or cuffing flaps at both side edges of the sheet so that the back surfaces of both sides of the sheet are folded over and joined. Seams made by joining such convolute or cuffed flaps are desirable in making bags with side gussets as well in joining the flaps at the edges of the sleeve valve to the walls of the bag at the valve opening. Seams formed of such convolutely folded or cuffed flaps also serve to decrease the tendency of the bags to tear at the seams or junctures and thereby contribute additional strength to the bag.

Although the present disclosure refers particularly to bags formed of a single sheet or ply of a thermoplastic resinous sheet material such as those made from poly-ethylene, polypropylene, poly[vinyl chloride], and poly[vinylidine chloride] resins, it is to be understood that composite sheets or laminates of these resins with each other and with other thermoplastic resins, for example, polyamide resins such as the nylons, polyester resins such as Mylar (registered trademark of E. I. du Pont de Nemours & Co. for a polymer of the glycol ester of terephthalic acid), and copolymers of ethylene and vinyl acetate, including such composite sheets or laminates that have been produced by extrusion coating or emulsion coating or by lamination by means of heat and pressure, are included within the purview or scope of this invention.

The all-plastic valved bags of the present invention and processes for their production are further described hereinafter by reference to the accompanying drawings which are as follows.

Figure 1:
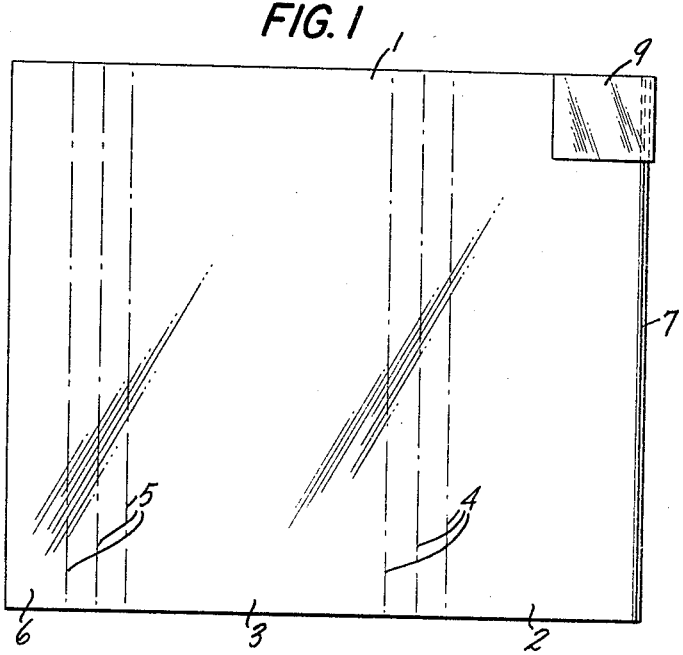
FIG. 1 is a top view of a sheet prior to its folding into a bag tube from which the bag of the present invention is formed, which shows the interior walls of the bag spread out, the fold lines required to form the side gussets of the bag, and a valve sleeve that has been joined to the walls of the bag by means of a strand of a thermoplastic resin.
Figure 3:
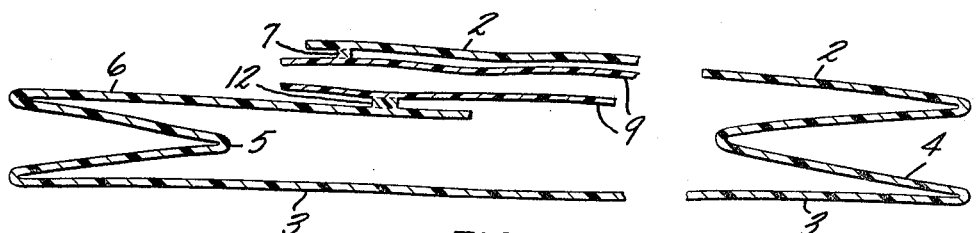
FIG. 3 is an enlarged sectional view of the bag along a correspondingly numbered section line of FIG. 2.

The walls of the bag of the present invention are formed from a single integral sheet 1 of a thermoplastic resinous material as shown in FIG. 1, which consists of front and rear walls 2 and 3, respectively. Lines 4 and 5 of FIG. 1, which consist of dots and dashes, represent the lines along which the sheet is folded to form gusseeted side walls that are shown in the sectional views of FIGS. 3 and 4. In folding the sheet into a bag tube, side 2 is referred to as the long flap while side 6 of wall 3 is referred to as the short flap.

Before the sheet 1 is folded into a bag tube, however, a strand 7 of a molten thermoplastic resin is extruded from the nozzle of an extruding die 8 (FIG 10A) onto the flap at the side edge of the back side of front wall 2 of the bag as the sheet is progressively advanced in the machine. While the extruded strand is still hot and plastic, a valve sleeve 9, formed by folding over once upon itself a sheet of thermoplastic resinous material that may be and preferably is thinner than the thermoplastic resinous sheet material from which the walls of the bag are made, is placed upon the extruded strand 7 and is joined by means of this strand to the wall 2 by pressing, for example, by means of a pressure roll 10 as shown in FIG. 10A.

After one surface of the valve sleeve 9 has been joined to front wall 2 the sheet is then formed into a bag tube having side gussets 4, 5 and pressed flat with the joined valved sleeve 9 folded over inside the bag tube and superimposed upon flap 6, which is the flap along the edge of the front side of rear wall 3.

The overlapping flaps 2 and 6 of the flattened bag are then spread apart or separated to admit the nozzle of an extrusion die 11 that is then placed therebetween, from which a second strand 12 of thermoplastic resin is extruded upon flap 6 as a continuous strand, or from one end to the other end of the bag if the bag is being made singly. Before the strand has cooled and hardened, overlapping flaps 2 and 6 are pressed together, for example, with another pressure roll 13 such as is shown in FIG. 10B, to fuse together the strand and the adjacent surfaces of the thermoplastic resinous sheet material. This second extruded strand of thermoplastic resin serves to close the seam of the bag tube as well as join the theretofore unattached side of the valve sleeve 9 to the short flap 6 of the rear wall 3 of the bag.

Figures 10A, 10B:
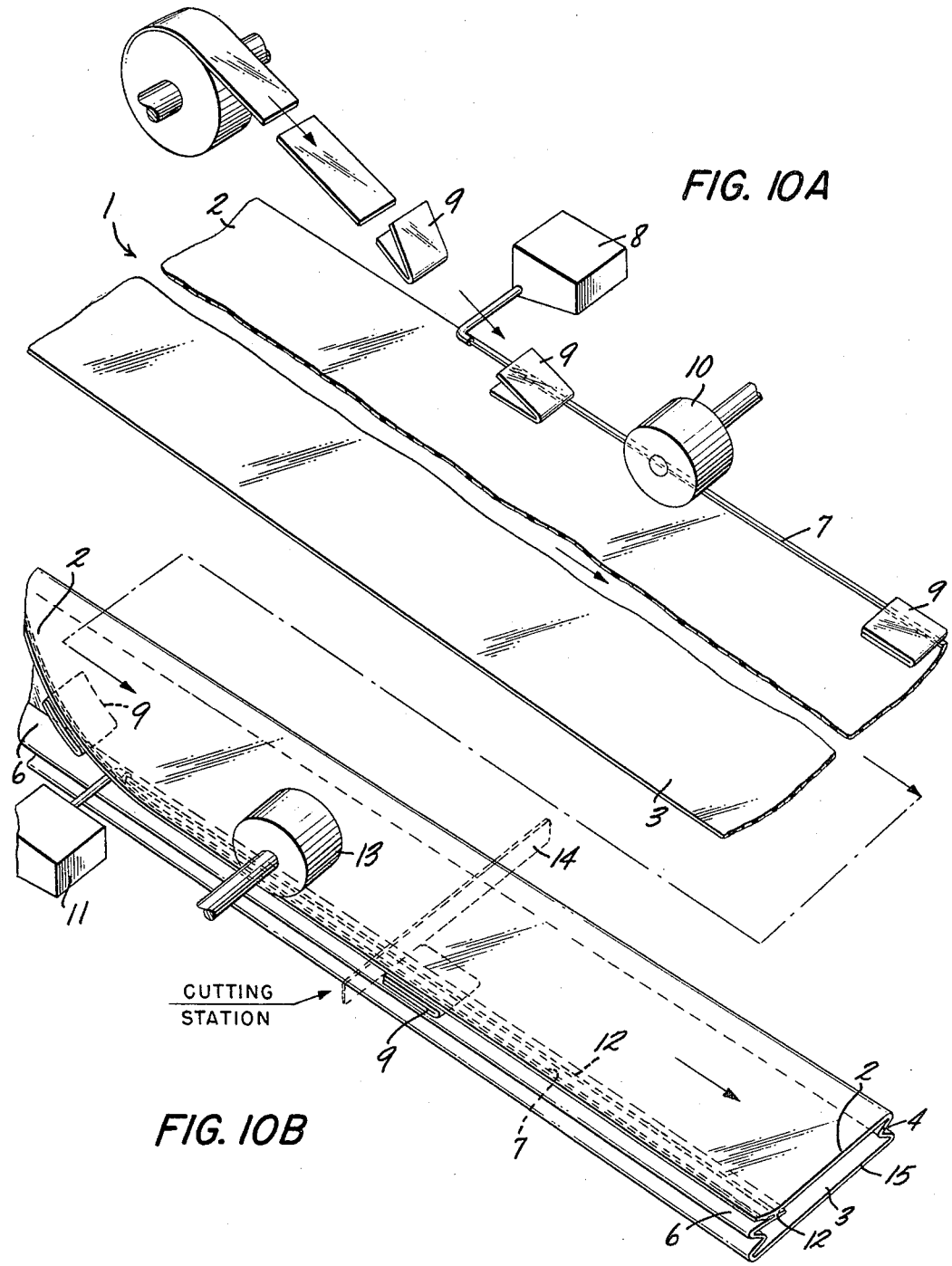
FIGS. 10A and 10B are fragmentary three-quarter perspective views of a machine for the continuous production of bags in which the process of the present invention is represented schematically.

When bags are being made from a continuous web of thermoplastic resinous sheet material as represented schematically in FIGS. 10A and 10B, a conventional cutting device 14 is used to cut the continuous bag tube into suitable bag lengths. In this cutting operation the ends of the walls of the bags should be cut to be conterminous with the top edges of the valve sleeve 9.

Figure 2:
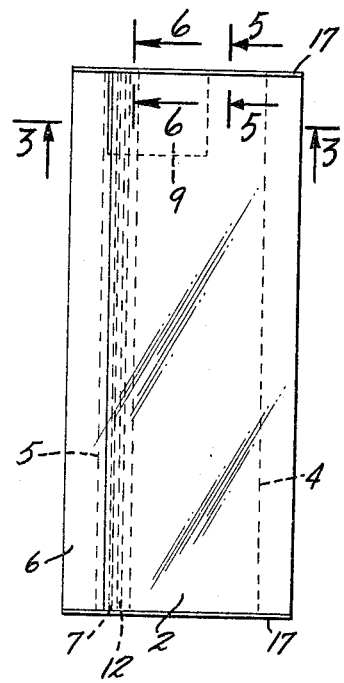
FIG. 2 is a front view of a flattened gusseted valved bag of the present invention.
Figure 5:
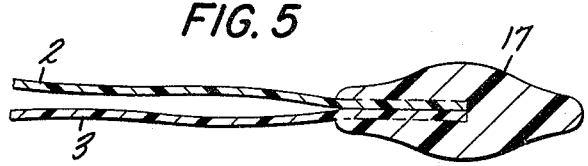
FIGS. 5 and 6 are sectional views that represent an end closure strip at the correspondingly numbered section lines of FIG. 2.
Figure 6:
Figure 7:
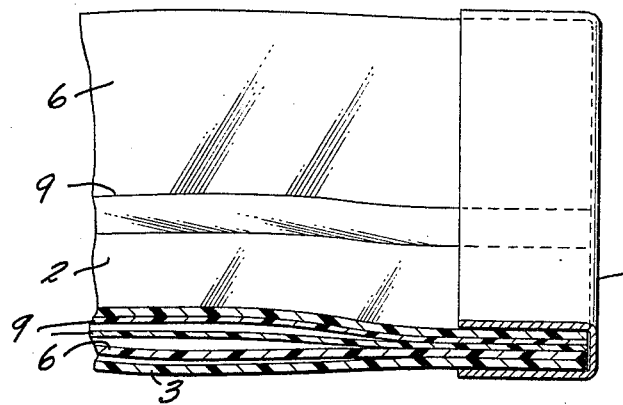
FIGS. 7 and 8 are perspective views of top corners of bags showing two additional different types of end closures in partial section.
Figure 8:
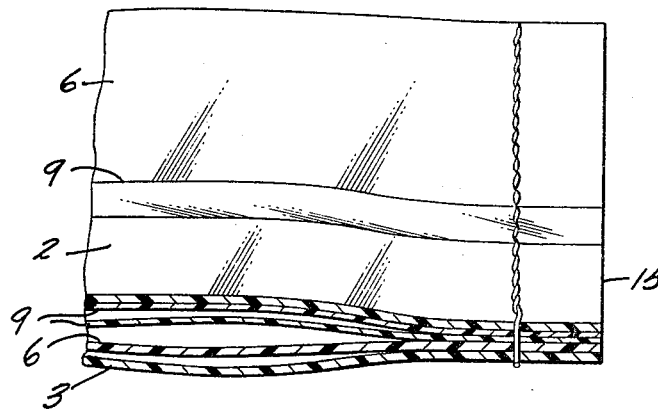
Figure 9:
FIG. 9 is a sectional view of still another type of end closure.

The open ends 15 of the bag tube are then closed in conventional manner, for example, by sewing the ends with a thread as represented in FIG. 8; by taping over the ends with a self-sealing tape 16, as represented in FIG. 7; or by fusing the ends together, as represented in FIG. 9, by bringing the conterminous edges thereof into contact with a heated surface maintained at a temperature sufficient to melt the thermoplastic resin. However, a preferred end closure 17, which is shown in FIGS. 2, 5, and 6, is the end closure that is applied to the conterminous ends of the bag by preliminarily fusing the edges together and thereafter extruding over the edges and outer surfaces at the ends of the bag a continuous strip of a molten thermoplastic resinous sheet material from which the walls of the bag tube are made that has a U-shaped cross section and thereafter stretching and shaping the extruded strip so that it has the cross-section shown and described in copending application Serial No. 285,317, filed June 4, 1963, and in U.S. Patent 3,221,789, granted December 7, 1965.

Figure 4:
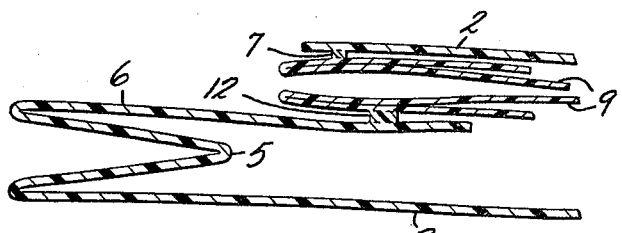
FIG. 4 is a sectional view of the bag along section line 3 of FIG. 2 representing a cuffed form of the valve sleeve represented in FIG. 3.

The section represented in FIG. 4 shows the result produced when the flaps of the valve sleeve 9 are cuffed on both sides before being joined first to the long flap 2 and then to the short flap 6 with the two strands 7 and 12 of thermoplastic resin.

Inasmuch as the foregoing description comprises preferred embodiments of the invention which were selected merely for purposes of illustration, it is to be understood that the invention is not restricted thereto and that modifications and variations may be made therein in accordance with the principles disclosed without departing from the invention, whose scope is to be restricted only by the appended claims.

The embodiments of the invention in which an exclusive property or privilege is claimed are defined as follows:

1. The method for the production of an all-plastic valved bag which comprises
   (a) extruding, onto a flap of a sheet of a thermoplastic resinous material from which the walls of the bag are to be formed, essentially parallel and close to the edge of the flap that is to be included in a vertical side seam of the bag, a strand of a molten thermoplastic resin that is compatible with the thermoplastic resin of which said sheet is made,
   (b) applying to the thus extruded molten strand while the strand is still warm and plastic, a valve sleeve consisting of an essentially rectangular sheet of a thermoplastic resinous sheet material that is compatible with the thermoplastic resin from which the sheet that is to form the walls of the bag is made, which rectangular sheet has been folded over once upon itself in such a manner that the edge that is folded over is essentially conterminous with the horizontal top edge of the sheet from which the walls of the bag are to be formed, and the vertical open side ends of the valve sleeve nearest the edge of the sheet are essentially conterminous with the vertical extruded strand of molten compatible thermoplastic resin,
   (c) pressing the flap at the outer edge of the valve sleeve into contact with the underlying extruded strand of molten compatible thermoplastic resin while the strand is still warm and plastic, thereby joining the valve sleeve to the sheet from which the walls of the bag are to be formed,
   (d) folding the sheet into an essentially flat bag tube in which the flap to which the valve sleeve is joined and the valve sleeve are superimposed over and in overlapping relation with the flap at the opposite edge of the sheet,
   (e) extruding, upon the bottom flap of the essentially flat bag tube while the two flaps that overlap are spread apart, a second continuous strand of a molten compatible thermoplastic resin parallel to the edge of the flap,
   (f) immediately bringing the top flap of the essentially flat bag tube into contact with the bottom flap upon which the continuous strand of molten compatible thermoplastic resin has been extruded while the strand is still warm and plastic, and
   (g) subsequently sealing both horizontal open ends of the bag tube.

2. The method as defined in claim 1 in which both horizontal open ends of the bag tube are sealed by subjecting them to a temperature in excess of the melting point of the thermoplastic resin from which the sheet from which the walls of the bag are formed.

3. The method as specified in the foregoing claim 1, and in which said valve sleeve before being applied in place is also folded over upon itself to form cuff areas thereon along said vertical open side ends of the valve sleeve.

References Cited by the Examiner
UNITED STATES PATENTS

| | | | |
|---|---|---|---|
| 3,089,636 | 5/1963 | Swartz | 229—62.5 |
| 3,102,676 | 9/1963 | Danelli et al. | 229—62.5 |
| 3,130,647 | 4/1964 | Anderson et al. | 93—35 |
| 3,181,439 | 5/1965 | Flax | 93—35 |

References Cited by the Applicant
UNITED STATES PATENTS

| | | |
|---|---|---|
| 3,050,235 | 8/1962 | Tomson. |
| 1,946,995 | 2/1934 | Weaver. |
| 3,131,853 | 5/1964 | Quaadgras et al. |

BERNARD STICKNEY, *Primary Examiner.*

FRANKLIN T. GARRETT, *Examiner.*